United States Patent
Khan et al.

(10) Patent No.: US 8,009,560 B2
(45) Date of Patent: Aug. 30, 2011

(54) DETECTING AND MANAGING CONGESTION ON A SHARED NETWORK LINK

(75) Inventors: Humayun Mukhtar Khan, Issaquah, WA (US); Renato Machado de Sousa, Seattle, WA (US); Hiu Hok Chan, Issaquah, WA (US); Shiwei Wang, Bellevue, WA (US); Jiannan Zheng, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 133 days.

(21) Appl. No.: 12/346,849

(22) Filed: Dec. 31, 2008

(65) Prior Publication Data

US 2010/0165840 A1 Jul. 1, 2010

(51) Int. Cl.
*H04L 12/28* (2006.01)

(52) U.S. Cl. ........................ 370/230; 370/235

(58) Field of Classification Search .......... 370/252, 370/229–233
See application file for complete search history.

(56) References Cited

U.S. PATENT DOCUMENTS

| | | | |
|---|---|---|---|
| 6,643,259 B1 | 11/2003 | Borella et al. | |
| 6,992,981 B2 * | 1/2006 | Morikawa et al. | 370/229 |
| 7,099,954 B2 | 8/2006 | Li et al. | |
| 7,142,506 B1 * | 11/2006 | Pogrebinsky | 370/229 |
| 7,345,996 B2 * | 3/2008 | Imiya et al. | 370/229 |
| 7,359,004 B2 | 4/2008 | Yu et al. | |
| 7,430,219 B2 * | 9/2008 | Itoh et al. | 370/465 |
| 7,443,882 B2 * | 10/2008 | Ohki et al. | 370/468 |
| 7,450,508 B2 * | 11/2008 | Cha et al. | 370/232 |
| 7,515,536 B2 * | 4/2009 | Roth | 370/230 |
| 7,525,914 B2 * | 4/2009 | Overgaard | 370/232 |
| 7,701,884 B2 * | 4/2010 | Chapweske et al. | 370/260 |
| 7,746,780 B2 * | 6/2010 | Seo | 370/232 |
| 7,773,509 B2 * | 8/2010 | Rahman et al. | 370/230 |
| 7,821,937 B1 * | 10/2010 | Guo | 370/232 |
| 7,835,279 B1 * | 11/2010 | Lemaire et al. | 370/230.1 |
| 7,852,764 B2 * | 12/2010 | Yamaguchi et al. | 370/231 |
| 2002/0136164 A1 * | 9/2002 | Fukuda et al. | 370/230 |
| 2005/0005020 A1 * | 1/2005 | Rey et al. | 709/231 |
| 2005/0232151 A1 * | 10/2005 | Chapweske et al. | 370/231 |
| 2006/0159098 A1 | 7/2006 | Munson et al. | |
| 2007/0211633 A1 | 9/2007 | Gunawardena et al. | |
| 2007/0297414 A1 | 12/2007 | Gupta et al. | |
| 2009/0103434 A1 * | 4/2009 | Madsen et al. | 370/232 |
| 2009/0138784 A1 * | 5/2009 | Tamura et al. | 714/776 |
| 2010/0039937 A1 * | 2/2010 | Ramanujan et al. | 370/232 |

(Continued)

OTHER PUBLICATIONS

Luby, et al., "Wave and Equation Based Rate Control using Multicast Round Trip Time", retrieved at <<http://conferences.sigcomm.org/sigcomm/2002/papers/webrc.pdf>> Aug. 19-23, 2002, ACM, pp. 14.

(Continued)

*Primary Examiner* — Ricky Ngo
*Assistant Examiner* — Ben H Liu
(74) *Attorney, Agent, or Firm* — Hope Baldauff Hartman, LLC

(57) ABSTRACT

Technologies are described herein for detecting and managing congestion on a shared network link. A determination is made whether the shared network link is congested based on loss rate and round-trip time (RTT) between a computer and a receiver operatively coupled by the shared network link. Upon determining that the shared network link is congested, a back-off operation is performed on the computer. The back-off operation may reduce an allocated bandwidth of the computer on the shared network link by transforming a higher allocated bandwidth into a lower allocated bandwidth.

18 Claims, 3 Drawing Sheets

U.S. PATENT DOCUMENTS

2010/0098033 A1* 4/2010 Lee et al. .................. 370/338

OTHER PUBLICATIONS

Kunniyur, et al., "End-to-End Congestion Control Schemes: Utility Functions, Random Losses and ECN Marks", retrieved at <<http://einstein.seas.upenn.edu/mnlab/papers/Kunniyur_end2end.pdf>> Mar. 5, 2003, pp. 1-28.

Balakrishnan, et al., "An Integrated Congestion Management Architecture for Internet Hosts", retrieved at <<http://www-2.cs.cmu.edu/~srini/Papers/1999.Balakrishnan.sigcomm.pdf>> 1999 ACM, pp. 175-187.

Jagannathan, et al., "Topology Sensitive Congestion Control for Real-Time Multicast", retrieved at <<http://imj.gatech.edu/papers/NOSSDAV-00b.pdf.gz>> pp. 10, 2000.

Anderson, et al., "PCP: Efficient Endpoint Congestion Control", retrieved at <<http://www.usenix.org/event/nsdi06/tech/full_papers/anderson/anderson.pdf>> NSDI 2006: 3rd Symposium on Networked Systems Design & Implementation, pp. 197-210.

* cited by examiner

DETECTING AND MANAGING CONGESTION ON A SHARED NETWORK LINK

BACKGROUND

Various network configurations may involve multiple computers sharing a single network link. In an illustrative configuration, an enterprise may deploy centralized servers (e.g., in a data center) for hosting corporate data, applications, and services. One or more remote users (e.g., at a branch office) may then access the data center over a single network link, such as a wide area network ("WAN") link. For example, a server computer in Austin, Tex. may host a video conference call accessed by multiple users in an Atlanta, Ga. branch office. In this case, the users in Atlanta may share a WAN link within the branch office.

The effectiveness of the network link may depend on the amount of bandwidth utilized on the network link. In particular, overconsumption of bandwidth may result in congestion at the network link, potentially causing the network link to lose data packets during transmission. One approach to resolving congestion on the network link is to transmit redundant data in order to compensate for lost data packets. For example, forward error correction ("FEC") or another suitable mechanism may be utilized. However, FEC may cause additional congestion on the network by introducing additional data traffic onto the network link. Further, transmitting redundant data does not address the problem of congestion.

Another approach to resolving congestion on the network link is to dynamically manage the amount of data traffic transmitted on the network link. In particular, if congestion is detected on the network link, then the amount of data traffic transmitted across the network may be reduced in an attempt to reduce the congestion. However, conventional techniques for determining the presence of congestion on the network link have drawbacks. For example, one way to determine the presence of congestion on the network link involves utilizing a conventional link speed detection process. A conventional link speed detection process measures link capacity across the network link and is generally adequate for detecting a bottleneck in the last hop (e.g., a router) on the network link. However, the link speed detection process may fail to detect the presence of congestion across the entire network link.

It is with respect to these considerations and others that the disclosure made herein is presented.

SUMMARY

Technologies are described herein for detecting and managing congestion on a shared network link. In an illustrative implementation, a program module may be configured to detect congestion based on a loss rate and a round-trip time (RTT) between a sender computer and a receiver computer sharing a network link. Upon detecting a worsening loss rate and an increasing RTT, the program module may perform a back-off operation whereby the bandwidth allocated to the sender computer for transmitting data across the shared network link is reduced. The program module may monitor the loss rate and the RTT to determine whether congestion persists or improves. When the program module determines that the congestion has improved, it may perform a recovery operation whereby the bandwidth allocated to the sender computer is gradually increased.

According to one embodiment presented herein, a method is provided for detecting and managing congestion on a shared network link. According to the method, a determination is made whether the shared network link is congested based on loss rate and RTT between a computer and a receiver operatively coupled by the shared network link. Upon determining that the shared network link is congested, a back-off operation is performed on the computer. In particular, the back-off operation may reduce an allocated bandwidth of the computer on the shared network link by transforming a higher allocated bandwidth into a lower allocated bandwidth.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for detecting and managing congestion on a shared network link. Through the utilization of the technologies and concepts presented herein, a computer may utilize packet loss rate (hereinafter referred to as loss rate) and round-trip time ("RTT") to infer that a network link is congested. Upon determining that the network link is congested, the computer can reduce the amount of data traffic it can send on the network link. The amount of data traffic the computer can send on the network link is referred to herein as the allocated bandwidth. The operation by which the computer reduces the allocated bandwidth of the computer is referred to herein as a back-off operation or simply as backing off.

Upon determining that the network is not currently congested, the computer may conclude that the network link is recovering from the congestion and that backing off is effective. As a result, the computer may increase the allocated bandwidth of the computer in order to allow additional data traffic to be sent on the network link.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
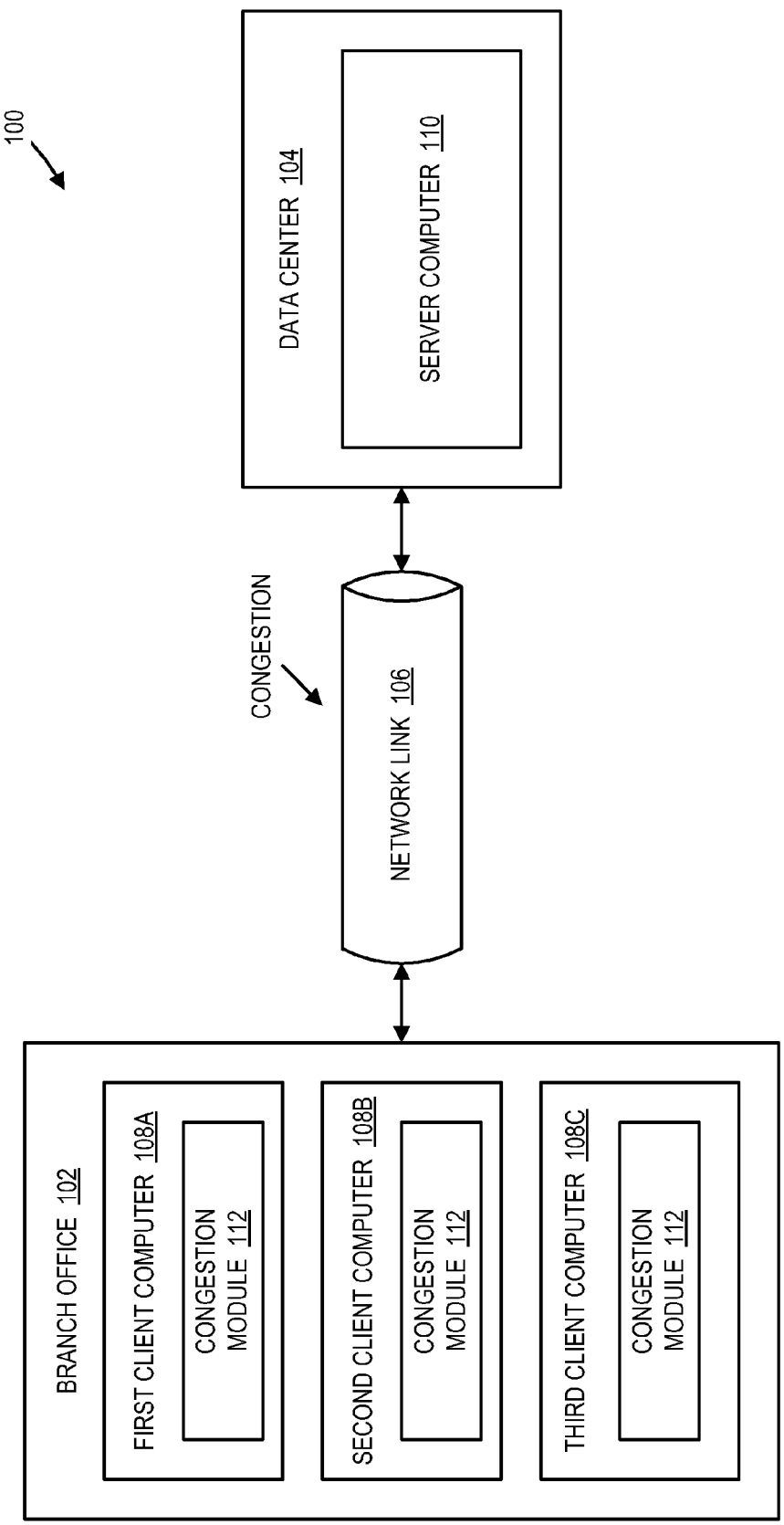
FIG. 1 is a network architecture diagram showing a network architecture capable of detecting and managing congestion on a shared network link.

In the following detailed description, references are made to the accompanying drawings that form a part hereof, and which are shown by way of illustration specific embodiments or examples. Referring now to the drawings, in which like numerals represent like elements through the several figures, a computing system and methodology for detecting and managing congestion on a network link will be described. In particular, FIG. 1 illustrates a simplified network architecture 100 including a branch office 102 and a data center 104 coupled via a network link 106. The network link 106 may be a wide area network ("WAN") or other suitable network. The branch office 102 includes a first client computer 108A, a second client computer 108B, and a third client computer 108C (collectively or generically referred to as computers 108 or computer 108). The data center 104 includes a server computer (hereinafter referred to as a server) 110. In other embodiments, the branch office 102 and the data center 104 may include any suitable number of client computers and servers as contemplated by those skilled in the art.

As illustrated in FIG. 1, one or more of the computers 108 and the server 110 may include a congestion module 112. As described in greater detail below, the congestion module 112 may be configured to detect congestion on the network link 106 caused by data traffic transmitted from the computers 108 to the server 110. In this case, the computers 108 may be referred to as senders, and the server 110 may be referred to as a receiver. Upon detecting the congestion, the congestion module 112 may attempt to reduce the congestion by performing a back-off operation. In particular, the congestion module 112 may attempt to reduce the congestion by reducing the allocated bandwidth, which specifies the amount of data traffic that can be sent on the network link 106.

According to embodiments, the computers 108 and the server 110 may transmit data traffic, and in particular, real-time or near real-time audio data and video data traffic, via User Datagram Protocol ("UDP") and Real-Time Transport Protocol ("RTP") across the network link 106. The RTP provides a reception quality feedback mechanism through Real-Time Control Protocol ("RTCP") sender and receiver reports (collectively and generically referred to as RTCP reports and RTCP report). In particular, the RTCP reports may provide transmission and reception statistics for RTP packets sent during a given interval.

The RTCP reports are defined in Request for Comments ("RFC") 3550, Section 6.4. In particular, the RFC 3550, Section 6.4 defines various fields included in the RTCP reports. The RFC 3550, Section 6.4 further defines various computations that can be performed based on the fields. Two computations defined by the RFC 3550 are the loss rate and the RTT.

The RFC 3550 defines the loss rate as follows: "An example calculation is the packet loss rate over the interval between two reception reports. The difference in the cumulative number of packets lost gives the number lost during that interval. The difference in the extended last sequence numbers received gives the number of packets expected during the interval. The ratio of these two is the packet loss fraction over the interval. This ratio should equal the fraction lost field if the two reports are consecutive, but otherwise it may not. The loss rate per second can be obtained by dividing the loss fraction by the difference in NTP [Network Time Protocol] timestamps, expressed in seconds. The number of packets received is the number of packets expected minus the number lost. The number of packets expected may also be used to judge the statistical validity of any loss estimates. For example, 1 out of 5 packets lost has a lower significance than 200 out of 1000."

Further, the RFC 3550 defines the RTT as follows: "Let SSRC_r denote the receiver issuing this receiver report. Source SSRC_n can compute the round-trip propagation delay to SSRC_r by recording the time A when this reception report block is received. It calculates the total round-trip time A-LSR using the last [sender report] timestamp (LSR) field, and then subtracting [the delay since last sender report (DLSR)] field to leave the round-trip propagation delay as (A-LSR—DLSR)."

According to embodiments, the congestion module 112 is configured to detect congestion on the network link 106 based on the loss rate and the RTT. In particular, congestion on the network link 106 may cause the network link 106 to lose data packets. As a result, a worsening loss rate may be utilized as a factor in detecting congestion on the network link 106. In one embodiment, the congestion module 112 compares the loss rate to a loss rate threshold. If the loss rate is greater than the loss rate threshold, then the congestion module 112 may identify the network link 106 as being congested. In another embodiment, the congestion module 112 determines whether the loss rate has increased by a given amount. If the loss rate has increased by the given amount, then the congestion module 112 may identify the network link 106 as being congested.

Although the loss rate is generally indicative of congestion, some networks, such as wireless networks, may suffer from packet loss even without the presence of congestion. Thus, in order to verify that the packet loss actually results from congestion on the network link 106, the congestion module 112 may utilize the RTT. In particular, as congestion builds on the network link 106, queues on routers and other network elements on the network link 106 become more filled, thereby delaying the amount of time in which to transmit data traffic. In this regard, the RTT can supplement the loss rate in order to verify congestion on the network link 106. In one embodiment, the congestion module 112 compares the RTT to an RTT threshold. If the RTT is greater than the RTT threshold, then the congestion module 112 may identify the network link 106 as being congested.

Upon identifying the network link 106 as being congested based on the loss rate and the RTT, the congestion module 112 may perform a back-off operation in which the congestion module 112 reduces the amount of data traffic transmitted across the network link 106. In one embodiment, the congestion module 112 reduces the data traffic by an amount corresponding to the loss rate. For example, if the loss rate is 40% (i.e., 40% of the data packets sent are dropped), then an assumption can be made that the data traffic is 40% more than the network link 106 is capable of handling. As a result, the congestion module 112 may reduce the data traffic by 40%. In other embodiments, other suitable criteria may be utilized for determining the amount by which to the data traffic is reduced.

Upon performing the back-off operation, the congestion module 112 may monitor the congestion based on the loss rate and the RTT. In particular, the congestion module 112 may monitor the loss rate and the RTT to determine whether the congestion persists or improves. Upon identifying the network link 106 as not being congested (i.e., that the congestion has improved), the congestion module 112 may perform a recovery operation. The recovery operation may gradually increase the allocated bandwidth.

The following is a description of one example implementation of the back-off operation performed by the congestion module 112. In particular, the implementation includes criteria for determining when to perform the back-off operation, the extent of the back-off operation, when to perform the recovery operation, and the extent of the recovery operation. It should be appreciated that the implementation described below is merely illustrative and is not intended to be limiting.

When to Back Off

In one embodiment, the congestion module 112 performs a back-off operation if the following three conditions are satisfied. A first condition is met if the RTT is greater than an RRT threshold. For example, the RTT threshold may be about 500 milliseconds ("ms"). In the second condition, the number of data packets sent by the sender is greater than a packets threshold. In a third condition, the current loss rate is higher than a loss rate absolute threshold, or the current loss rate is higher than the previous loss rate by a loss rate percentage threshold.

How Much to Back Off

In the back-off operation, the current allocated bandwidth may be determined based on the previous allocated bandwidth and a bandwidth reduction. For example, the current allocated bandwidth may be determined in accordance with the following equation, where PreviousAllocatedBW refers to the previous allocated bandwidth, and BW Reduction refers to the bandwidth reduction:

$$CurrentAllocatedBW = PreviousAllocatedBW - BWReduction$$

If there is no previous allocated bandwidth, the initial bandwidth estimate may be used. The initial bandwidth estimate may be determined according to any suitable technique as contemplated by those skilled in the art. The bandwidth reduction may be determined by comparing the previous allocated bandwidth to the product of the optimal bandwidth and the optimal threshold. The optimal bandwidth is the bandwidth that the application utilizing the network link needs for performing acceptably. The optimal threshold may be used to adjust the optimal bandwidth.

If the previous allocated bandwidth is less than the product of the optimal bandwidth and the optimal threshold, then the congestion module 112 may determine the bandwidth reduction according to the following equation, where lossrate refers to the loss rate as specified by the RTCP reports, MinimumReductionCoefficient refers to a percentage of minimum reduction allowed by the back-off operation, MaximumReductionCoefficient refers to a percentage of maximum reduction allowed by the back-off operation, and OptimalBandwidth and OptimalThreshold are used as described above:

$$BWReduction = lossrate/100 \times PreviousAllocatedBW \times (MinimumReductionCoefficient + ((MaximumReductionCoefficient - MinimumReductionCoefficient) \times PreviousAllocatedBW/(OptimalBandwidth \times OptimalThreshold)))$$

If the previous allocated bandwidth is more than the product of the optimal bandwidth and the optimal threshold, then the congestion module 112 may determine the bandwidth reduction according to the following equation based on simple loss rate:

$$BWReduction = lossrate/100 \times PreviousBWEstimate \times MaximumReductionCoefficient$$

Prior to performing the back-off operation with the new allocated bandwidth, the new allocated bandwidth may be compared with a minimum bandwidth threshold. If the new allocated bandwidth is below the minimum bandwidth threshold, then the back-off operation is terminated. If the new allocated bandwidth is above the minimum bandwidth threshold, then the back-off operation is performed.

When to Recover (i.e. Stop or Reduce the Back-Off Operation)

Whenever the conditions for back-off are not met, the congestion module 112 may perform a recovery operation to increase the amount of data traffic sent across the network link 106. Upon determining to perform the recovery operation, the congestion module 112 determines the amount to increase the data traffic sent across the network link 106. In this regard, the congestion module 112 may determine an amount to increase the allocated bandwidth according to the equation previously described.

In the recovery operation, the current allocated bandwidth may be determined based on the previous allocated bandwidth and a bandwidth increase. For example, the current allocated bandwidth may be determined in accordance with the following equation, where BWIncrease refers to the bandwidth increase:

$$CurrentAllocatedBW = PreviousAllocatedBW + BWIncrease$$

The bandwidth increase may be determined by comparing the previous allocated bandwidth to the product of the optimal bandwidth and the optimal threshold. If the previous allocated bandwidth is less than the product of the optimal bandwidth and the optimal threshold, then the congestion module 112 may determine the bandwidth increase according to the following equation, where the MaximumIncreaseCoefficient refers to the percentage of maximum increase allowed by the recovery operation, and MinimumIncreaseCoefficient refers to the percentage of minimum increase allowed by the recovery operation:

$$BWIncrease = PreviousAllocatedBW \times (MaximumIncreaseCoefficient - ((MaximumIncreaseCoefficient - MinimumIncreaseCoefficient) \times PreviousAllocatedBW/(OptimalBandwidth \times OptimalThreshold)))$$

If the previous allocated bandwidth is more than the product of the optimal bandwidth and the optimal threshold, then the congestion module 112 may determine the bandwidth increase based on the minimum increase coefficient according to the following equation:

$$BWIncrease = PreviousAllocatedBW \times MinimumIncreaseCoefficient$$

Upon determining that the bandwidth estimate for network link 116 has increased, the congestion module 112 may also increase the allocated bandwidth accordingly, provided the previous allocated bandwidth was already close to the previous full bandwidth capacity.

Figure 2:
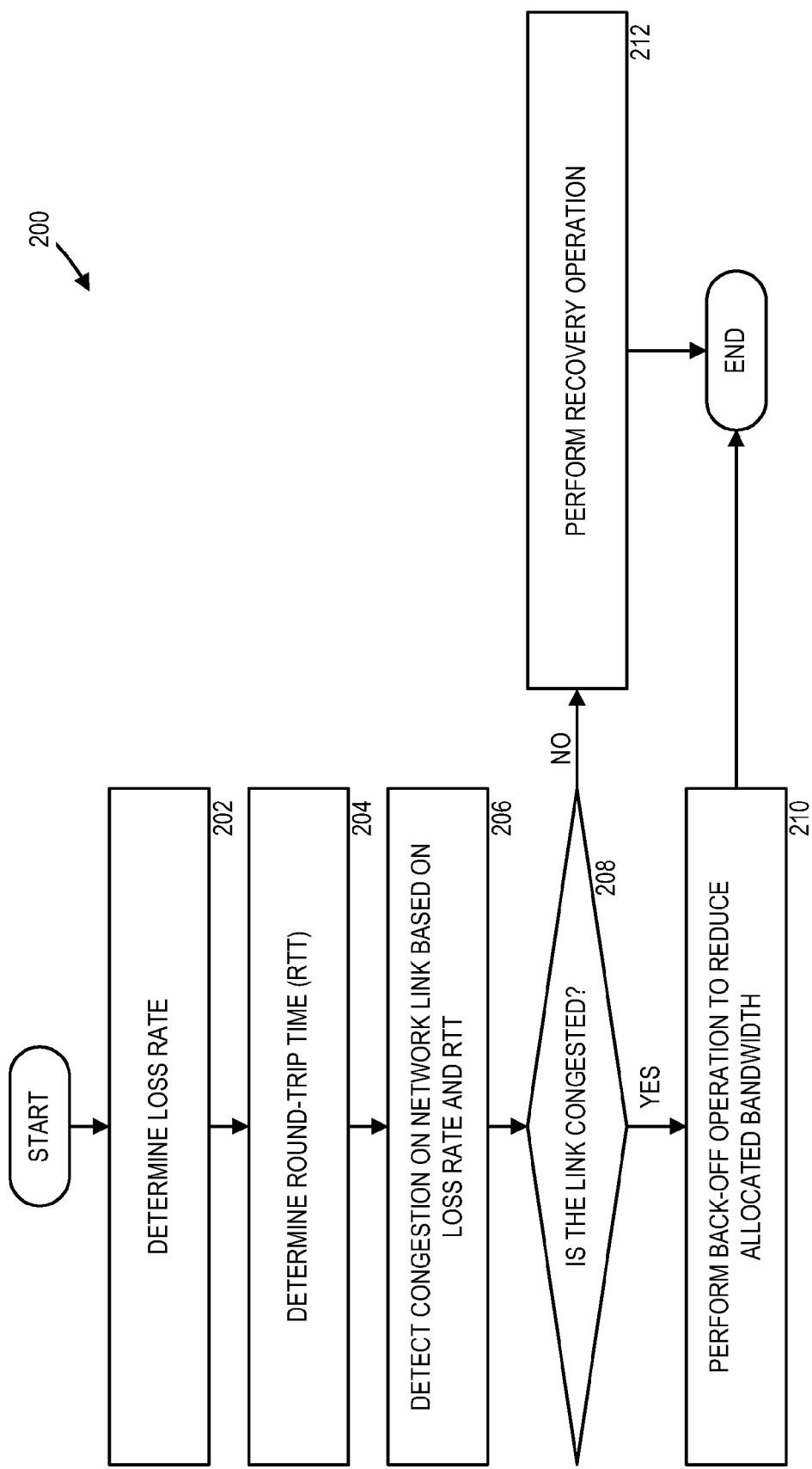
FIG. 2 is a flow diagram showing an illustrative process for detecting and managing congestion on a shared network link.

Referring now to FIG. 2, additional details will be provided regarding the embodiments presented herein for detecting and managing congestion on a shared network link. In particular, FIG. 2 is a flow diagram illustrating one method for detecting and managing congestion on a shared network link. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

The routine 200 begins at operation 202, where the congestion module 112 determines a loss rate between the computer 108 and the server 110. The loss rate may be determined based on a plurality of data packets sent from the computer 108 to the server 110. In one embodiment, the loss rate is determined based on RTCP reports sent from the server 110 to the computer 108. In particular, the RTCP reports may include information regarding data packets lost from the plurality of data packets sent from the computer 108. Upon determining the loss rate, the routine 200 proceeds to operation 204.

At operation 204, the congestion module 112 determines the RTT between the computer 108 and the server 110. The RTT may also be determined based on RTCP reports. Upon determining the RTT, the routine 200 proceeds to operation 206, where the congestion module 112 detects congestion on the network link 106. In particular, the congestion module 112 may determine congestion on the network link based on the loss rate and the RTT.

With regards to the loss rate, the congestion module 112 may determine whether the loss rate has worsened. In one embodiment, the congestion module 112 determines whether the loss rate has worsened by determining whether the loss rate has increased by a given amount. In another embodiment, the congestion module 112 determines whether the loss rate has worsened by determining whether the loss rate is higher than a loss rate threshold. With regards to the RTT, the congestion module 112 may determine whether the RTT is higher than a RTT threshold. In operation 208, the congestion module 112 may detect that the network link is congested if the loss rate has worsened and the RTT is higher than the RTT threshold. Upon detecting congestion on the network link 106, the routine 200 proceeds to operation 210. Otherwise, the routine 200 proceeds to operation 212.

At operation 210, the congestion module 112 performs a back-off operation to reduce the allocated bandwidth of the computer 108 for transmitting data traffic on the network link 106 to the server 110. By reducing the allocated bandwidth of the computer 108, the corresponding data traffic sent on the network link 106 is also reduced, which potentially reduces congestion on the network link 106. The back-off operation may reduce the allocated bandwidth of all of data traffic or only a portion of the data traffic. For example, the back-off operation may be configured to reduce the allocated bandwidth of higher bandwidth traffic, such as video data, and not to reduce the allocated bandwidth of lower bandwidth traffic, such as audio data.

In one embodiment, the computer 108 reduces the allocated bandwidth in accordance with the loss rate. That is, a higher loss rate may correlate to a lower allocated bandwidth (i.e., a greater reduction in the allocated bandwidth), while a lower loss rate may correlate to a higher allocated bandwidth (i.e., a lesser reduction in the allocated bandwidth).

However, if no congestion is detected on the network link, then the congestion module 112 may decide to perform a recovery operation. Accordingly, the routine 200 may proceed to operation 212, where the congestion module 112 performs a recovery operation to increase the allocated bandwidth of the computer 108 for transmitting data traffic on the network link 106 to the server 110. In one embodiment, the recovery operation increases the allocated bandwidth back to its original state prior to the back-off operation. In another embodiment, the recovery operation increases the allocated bandwidth in an amount that is less than the original state to lessen the reduction created by the back-off operation.

Figure 3:
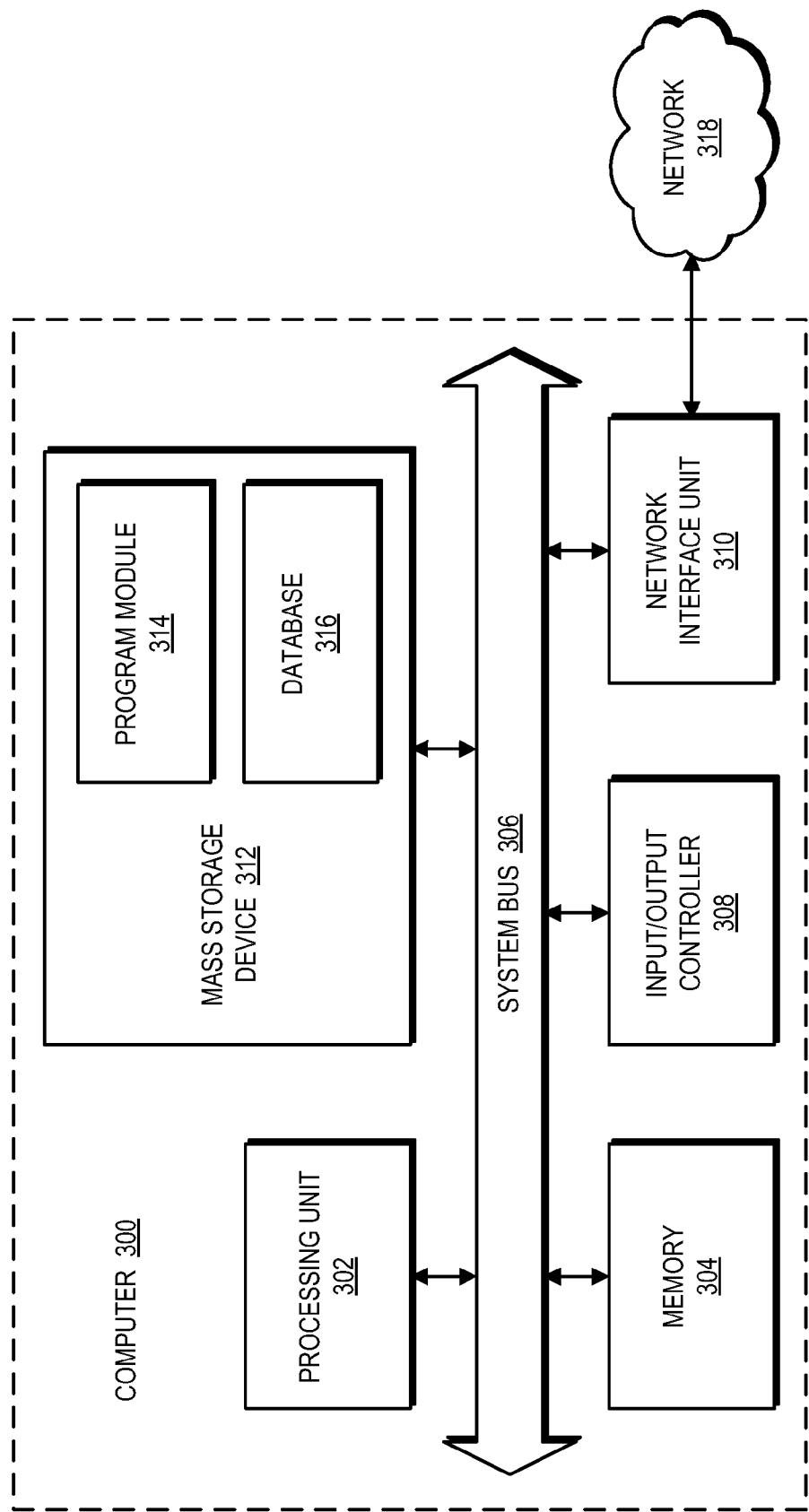
FIG. 3 is a computer architecture diagram showing an illustrative computer hardware architecture for a computing system capable of implementing the embodiments presented herein.

Referring now to FIG. 3, an exemplary computer architecture diagram showing a computer 300 is illustrated. Examples of the computer 300 may include the computer 108 and the server 110. The computer 300 includes a processing unit 302 ("CPU"), a system memory 304, and a system bus 306 that couples the memory 304 to the CPU 302. The computer 300 further includes a mass storage device 312 for storing one or more program modules 314 and one or more databases 316. An example of the program module 314 may be the congestion module 112. The routine 200 may also be embodied in the program module 314 and executed by the computer 300. The mass storage device 312 is connected to the CPU 302 through a mass storage controller (not shown) connected to the bus 306. The mass storage device 312 and its associated computer-readable media provide non-volatile storage for the computer 300. Although the description of computer-readable media contained herein refers to a mass storage device, such as a hard disk or CD-ROM drive, it should be appreciated by those skilled in the art that computer-readable media can be any available computer storage media that can be accessed by the computer 300.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 300.

According to various embodiments, the computer 300 may operate in a networked environment using logical connections to remote computers through a network 318. The computer 300 may connect to the network 318 through a network interface unit 310 connected to the bus 306. An example of the network 318 is the network link 106. It should be appreciated that the network interface unit 310 may also be utilized to connect to other types of networks and remote computer systems. The computer 300 may also include an input/output controller 308 for receiving and processing input from a number of input devices (not shown), including a keyboard, a mouse, a microphone, and a game controller. Similarly, the input/output controller 308 may provide output to a display or other type of output device (not shown).

Based on the foregoing, it should be appreciated that technologies for detecting and managing congestion on a shared network link are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for detecting and managing congestion on a shared network link, the method comprising:
   determining whether the shared network link is congested based on loss rate and round-trip time (RTT) between a computer and a receiver operatively coupled by the shared network link;
   upon determining that the shared network link is congested, performing a back-off operation on the computer, the back-off operation reducing an allocated bandwidth of the computer on the shared network link by an amount corresponding to the loss rate thereby transforming a higher allocated bandwidth into a lower allocated bandwidth; and
   upon determining that the shared network link is not congested, performing a recovery operation on the computer, the recovery operation increasing the allocated bandwidth of the computer on the shared network link, wherein the increase of the allocated bandwidth is determined by comparing a previously allocated bandwidth to a product of an optimal bandwidth and an optimal threshold.

2. The computer-implemented method of claim 1, wherein determining whether the shared network link is congested based on loss rate and RTT of the shared network link comprises:
   determining whether the loss rate has worsened;
   determining whether the RTT is higher than an RTT threshold; and
   upon determining that the loss rate has worsened and the RTT is higher than the RTT threshold, determining that the shared network link is congested.

3. The computer-implemented method of claim 2, wherein determining whether the loss rate has worsened comprises determining whether the loss rate has increased.

4. The computer-implemented method of claim 2, wherein determining whether the loss rate has worsened comprises determining whether the loss rate is higher than a loss rate threshold.

5. The computer-implemented method of claim 1, further comprising determining the loss rate based on a Real-Time Control Protocol (RTCP) report.

6. The computer-implemented method of claim 1, further comprising determining the RTT based on a Real-Time Control Protocol (RTCP) report.

7. The computer-implemented method of claim 1, wherein the allocated bandwidth of the computer on the shared network link comprises the allocated bandwidth of the computer for transmitting video on the shared network link.

8. The computer-implemented method of claim 1, wherein performing a back-off operation on the computer comprises:
   determining whether the reduced allocated bandwidth is lower than a minimum bandwidth threshold; and
   upon determining that the reduced allocated bandwidth is lower than the minimum bandwidth threshold, terminating the back-off operation.

9. The computer-implemented method of claim 1, wherein the operations of determining whether the shared network link is congested based on the loss rate and the RTT and performing the back-off operation may be repeated for multiple computers operatively coupled to the receiver through the shared network link.

10. A computer system comprising:
    a processor;
    a memory operatively coupled to the processor; and
    a program module (i) which executes in the processor from the memory and (ii) which, when executed by the processor, causes the computer system to detect and manage congestion on a shared network link by:
      determining a loss rate between the computer and a receiver operatively coupled through the shared network link, the loss being determined based on a Real-Time Control Protocol (RTCP) report;
      determining a round-trip time (RTT) between the computer and the receiver based on the RTCP report;
      determining whether the shared network link is congested based on the loss rate and the RTT;
      upon determining that the shared network link is congested, performing a back-off operation on the computer, the back-off operation reducing an allocated bandwidth of the computer on the shared network link by an amount corresponding to the loss rate; and
      upon determining that the shared network link is not congested, performing a recovery operation on the computer, the recovery operation increasing the allocated bandwidth of the computer on the shared network link, wherein the increase of the allocated bandwidth is determined by comparing a previously allocated bandwidth to a product of an optimal bandwidth and an optimal threshold.

11. The computer system of claim 10, wherein the computer is configured to transmit video data and audio data to the receiver through the shared network link.

12. The computer system of claim 11, wherein the allocated bandwidth of the computer on the shared network link comprises a first allocated bandwidth of the computer for transmitting the video data on the shared network link and excludes a second allocated bandwidth of the computer for transmitting the audio data on the shared network link.

13. The computer system of claim 11, wherein the video data and the audio data are transmitted to the receiver by user datagram protocol (UDP) through the shared network link.

14. A tangible computer-readable storage medium having computer-executable instructions stored thereon which, when executed by a computer, cause the computer to:
    determine, through the computer, a loss rate for a plurality of data packets sent from the computer to a receiver operatively coupled through a shared network link, the loss rate being determined based on a Real-Time Control Protocol (RTCP) report sent from the receiver to the computer regarding lost packets from the plurality of data packets;
    determine, through the computer, a round-trip time (RTT) between the computer and the receiver based on the RTCP report;
    determine, through the computer, whether the shared network link is congested based on the loss rate and the RTT;
    upon determining, through the computer, that the shared network link is congested, perform a back-off operation on the computer, the back-off operation reducing an allocated bandwidth of the computer on the shared network link by an amount corresponding to the loss rate; and
    upon determining, through the computer, that the shared network link is not congested, perform a recovery operation on the computer, the recovery operation increasing the allocated bandwidth of the computer on the shared network link, wherein the increase of the allocated bandwidth is determined by comparing a previously allocated bandwidth to a product of an optimal bandwidth and an optimal threshold.

15. The tangible computer-readable storage medium of claim 14, wherein to determine, through the computer, whether the shared network link is congested based on loss rate and RTT of the shared network link, the tangible computer-readable storage medium having further computer-executable instructions stored thereon which, when executed by the computer, cause the computer to:

determine, through the computer, whether the loss rate has increased;

determine, through the computer, whether the RTT is higher than an RTT threshold; and upon determining, through the computer, that the loss rate has increased and the RTT is higher than the RTT threshold, determining, through the computer, that the shared network link is congested.

16. The tangible computer-readable storage medium of claim 14, wherein to determine, through the computer, whether the shared network link is congested based on loss rate and RTT of the shared network link, the tangible computer-readable storage medium having further computer-executable instructions stored thereon which, when executed by the computer, cause the computer to:

determine, through the computer, whether the loss rate is higher than a loss rate threshold;

determine, through the computer, whether the RTT is higher than an RTT threshold; and upon determining, through the computer, that the loss rate is higher than the loss rate threshold and the RTT is higher than the RTT threshold, determine, through the computer, that the shared network link is congested.

17. The tangible computer-readable storage medium of claim 14, wherein to perform a back-off operation, the tangible computer-readable storage medium having further computer-executable instructions stored thereon which, when executed by the computer, cause the computer to:

determine, through the computer, whether the reduced allocated bandwidth is lower than a minimum bandwidth threshold; and upon determining, through the computer, that the reduced allocated bandwidth is lower than the minimum bandwidth threshold, terminate, through the computer, the back-off operation.

18. The tangible computer-readable storage medium of claim 14, wherein the tangible computer-readable storage medium having further computer-executable instructions stored thereon which, when executed by the computer, cause the computer to determine an amount to reduce the allocated bandwidth of the computer on the shared network link based on the loss rate.

* * * * *